(12) United States Patent
Lund et al.

(10) Patent No.: US 8,321,639 B2
(45) Date of Patent: Nov. 27, 2012

(54) COMMAND TRACKING FOR DIRECT ACCESS BLOCK STORAGE DEVICES

(75) Inventors: Timothy Lund, Rochester, MN (US); Carl Forhan, Rochester, MN (US)

(73) Assignee: LSI Corporation, Milpitas, CA (US)

(*) Notice: Subject to any disclaimer, the term of this patent is extended or adjusted under 35 U.S.C. 154(b) by 373 days.

(21) Appl. No.: 12/649,490

(22) Filed: Dec. 30, 2009

(65) Prior Publication Data
US 2011/0161552 A1   Jun. 30, 2011

(51) Int. Cl.
G06F 12/06 (2006.01)
(52) U.S. Cl. .................... 711/154; 711/E12.078
(58) Field of Classification Search .................. None
See application file for complete search history.

(56) References Cited

U.S. PATENT DOCUMENTS

| | | | |
|---|---|---|---|
| 4,402,046 A | 8/1983 | Cox et al. | |
| 5,121,480 A | 6/1992 | Bonke et al. | |
| 5,297,029 A | 3/1994 | Nakai | |
| 5,353,410 A | 10/1994 | Macon et al. | |
| 5,463,754 A | 10/1995 | Beausoleil et al. | |
| 5,732,409 A | 3/1998 | Ni | |
| 5,734,821 A | 3/1998 | Chung et al. | |
| 5,974,502 A | 10/1999 | DeKoning et al. | |
| 6,049,838 A | 4/2000 | Miller et al. | |
| 6,081,849 A | 6/2000 | Born et al. | |
| 6,145,072 A | 11/2000 | Shams et al. | |
| 6,158,004 A | 12/2000 | Mason et al. | |
| 6,212,617 B1 | 4/2001 | Hardwick | |
| 6,247,040 B1 | 6/2001 | Born et al. | |
| 6,324,594 B1 | 11/2001 | Ellis et al. | |
| 6,363,470 B1 | 3/2002 | Laurenti et al. | |
| 6,385,683 B1 | 5/2002 | DeKoning et al. | |
| 6,449,666 B2 | 9/2002 | Noeldner et al. | |
| 6,490,635 B1 * | 12/2002 | Holmes | 710/3 |
| 6,567,094 B1 | 5/2003 | Curry et al. | |
| 6,633,942 B1 | 10/2003 | Balasubramanian | |
| 6,678,785 B2 | 1/2004 | Lasser et al. | |
| 6,725,329 B1 | 4/2004 | Ng et al. | |
| 6,751,680 B2 | 6/2004 | Langerman et al. | |
| 7,069,559 B2 | 6/2006 | Janssen et al. | |
| 7,210,019 B2 | 4/2007 | Corrado | |
| 7,225,242 B2 | 5/2007 | Cherian et al. | |
| 7,286,549 B2 | 10/2007 | Gaur | |
| 7,290,066 B2 | 10/2007 | Voorhees et al. | |
| 7,408,834 B2 | 8/2008 | Conley et al. | |
| 7,461,183 B2 | 12/2008 | Ellis et al. | |
| 7,472,331 B2 | 12/2008 | Kim | |

(Continued)

OTHER PUBLICATIONS

Andrew Birrell & Michael Isard, et al., A Design for High-Performance Flash Disks, ACM SIGOPS Operating Systems Review, vol. 41, Issue 2, pp. 88-93, (Apr. 2007).

(Continued)

Primary Examiner — Edward Dudek, Jr.
Assistant Examiner — Ryan Dare

(57) ABSTRACT

Described embodiments provide tracking and processing of commands received by a storage device. For each received command, the storage device determines one or more requested logical block addresses (LBAs), including a starting LBA and a length of one or more LBAs of the received command. The storage device determines whether command reordering is restricted. If command reordering is not restricted, the storage device processes the received commands. Otherwise, if command reordering is restricted, the storage device conflict checks each received command. If no conflict is detected, the storage device tracks and processes the received command. Otherwise, if a conflict is detected, the storage device queues the received command.

19 Claims, 13 Drawing Sheets

U.S. PATENT DOCUMENTS

| | | |
|---|---|---|
| 7,512,847 B2 | 3/2009 | Bychkov et al. |
| 7,574,538 B1 | 8/2009 | Yochai |
| 7,590,803 B2 | 9/2009 | Wintergerst |
| 7,650,449 B2 | 1/2010 | Lu |
| 7,653,778 B2 | 1/2010 | Merry et al. |
| 7,925,847 B2 | 4/2011 | Ellis et al. |
| 2003/0051078 A1* | 3/2003 | Yoshitake ................ 710/9 |
| 2003/0110325 A1 | 6/2003 | Roach et al. |
| 2003/0167395 A1 | 9/2003 | Chang et al. |
| 2004/0044873 A1 | 3/2004 | Wong et al. |
| 2004/0177212 A1 | 9/2004 | Chang et al. |
| 2005/0114729 A1 | 5/2005 | Nielsen et al. |
| 2005/0144516 A1 | 6/2005 | Gonzalez et al. |
| 2005/0203988 A1 | 9/2005 | Nollet et al. |
| 2006/0050693 A1 | 3/2006 | Bury et al. |
| 2006/0095611 A1 | 5/2006 | Winchester et al. |
| 2006/0123259 A1 | 6/2006 | Yokota et al. |
| 2007/0028040 A1 | 2/2007 | Sinclair |
| 2007/0109856 A1 | 5/2007 | Pellicone et al. |
| 2007/0255889 A1 | 11/2007 | Yogev et al. |
| 2007/0266200 A1 | 11/2007 | Gorobets et al. |
| 2008/0034153 A1 | 2/2008 | Lee et al. |
| 2008/0052446 A1 | 2/2008 | Lasser et al. |
| 2008/0082726 A1 | 4/2008 | Elhamias |
| 2008/0120456 A1 | 5/2008 | Lee et al. |
| 2008/0140916 A1 | 6/2008 | Oh et al. |
| 2008/0155145 A1 | 6/2008 | Stenfort |
| 2008/0162079 A1 | 7/2008 | Astigarraga et al. |
| 2008/0224924 A1 | 9/2008 | Lethbridge |
| 2008/0263307 A1 | 10/2008 | Adachi |
| 2008/0279205 A1 | 11/2008 | Sgouros et al. |
| 2009/0138663 A1 | 5/2009 | Lee et al. |
| 2009/0172308 A1* | 7/2009 | Prins et al. ................ 711/154 |
| 2009/0271562 A1 | 10/2009 | Sinclair |
| 2009/0271796 A1 | 10/2009 | Kojima |
| 2009/0282301 A1 | 11/2009 | Flynn et al. |
| 2009/0285228 A1 | 11/2009 | Bagepalli et al. |
| 2009/0287859 A1 | 11/2009 | Bond et al. |
| 2009/0300277 A1 | 12/2009 | Jeddeloh |
| 2009/0313444 A1 | 12/2009 | Nakamura |
| 2010/0011260 A1 | 1/2010 | Nagadomi et al. |
| 2010/0023800 A1 | 1/2010 | Harari et al. |
| 2010/0122148 A1 | 5/2010 | Flynn et al. |
| 2010/0325317 A1 | 12/2010 | Kimelman et al. |
| 2011/0041039 A1 | 2/2011 | Harari et al. |
| 2011/0055458 A1 | 3/2011 | Kuehne |
| 2011/0099355 A1 | 4/2011 | Tran |

OTHER PUBLICATIONS

Jeong-Uk Kang & Heeseung Jo, et al., A Superblock-Based Flash Translation Layer for NAND Flash Memory, Proceedings of the 6th ACM & IEEE International Conference on Embedded Software, pp. 161-170, (Oct. 22-25, 2006).

SCSI Primary Commands specification, SPC-3, Section 7.4.6, p. 285, (May 4, 2005).

Sun et al.; On the Use of Strong BCH Codes for Improving Multilevel NAND Flash Memory Storage Capacity; ECSE Department, Rensselaer Polytechnic Institute, Aug. 2006; USA.

Micro Technology, Inc.; NAND Flash 101: An Introduction to NAND Flash and How to Design it into your next Product; TN-29-19; 2006; pp. 1-28; Micron Technology, Inc. Boise, Idaho, USA.

TCG Core Architecture Specification, Version 2.0, Trusted Computing Group, 2009 USA.

TCG Storage Interface Interactions Specification, Version 1.0, Trusted Computing Group, 2009 USA.

TCG Storage SSC: Enterprise, Version 1.0, Trusted Computing Group 2009 USA.

TCG Storage SSC: Opal, Version 1.0, Trusted Computing Group 2009 USA.

Specification for the Advanced Encryption Standard (AES), Federal Information Processing Standard (FIPS) Publication 197, 2001 USA.

Specification for the Secure Hash Standard (SHS), FIPS Publication 180-3 (2008), National Institute of Standards and Technology (NIST) USA.

* cited by examiner

STATE 1

1402  0x3080 | 0 | 1 | 1 | 0 | 0 | 0 |
1402(1) 1402(2) 1402(3) 1402(4) 1402(5) 1402(6)

... | 0 | 0 | 0 | 0 | 0 | 0 |
1402(122) 1402(123) 1402(124) 1402(125) 1402(126) 1402(127) 1402(128)

1404  0x3100 | 0 | 0 | 0 | 0 | 0 | 1 |
1404(1) 1404(2) 1404(3) 1404(4) 1404(5) 1404(6)

... | 0 | 0 | 0 | 1 | 1 | 1 | 1 |
1404(122) 1404(123) 1404(124) 1404(125) 1404(126) 1404(127) 1404(128)

STATE 2

1402  0x3080 | 0 | 1 | 1 | 0 | 0 | 0 |
1402(1) 1402(2) 1402(3) 1402(4) 1402(5) 1402(6)

... | 0 | 1 | 1 | 1 | 1 | 1 | 1 |
1402(122) 1402(123) 1402(124) 1402(125) 1402(126) 1402(127) 1402(128)

1404  0x3100 | 1 | 1 | 1 | 0 | 0 | 1 |
1404(1) 1404(2) 1404(3) 1404(4) 1404(5) 1404(6)

... | 0 | 0 | 1 | 1 | 1 | 1 | 1 |
1404(122) 1404(123) 1404(124) 1404(125) 1404(126) 1404(127) 1404(128)

COMMAND TRACKING FOR DIRECT ACCESS BLOCK STORAGE DEVICES

CROSS-REFERENCE TO RELATED APPLICATIONS

The subject matter of this application is related to U.S. patent application Ser. No. 12/436,227 filed May 6, 2009, Ser. No. 12/475,710 filed Jun. 1, 2009, Ser. No. 12/475,716 filed Jun. 1, 2009, Ser. No. 12/477,996 filed Jun. 4, 2009, Ser. No. 12/478,013 filed Jun. 4, 2009, Ser. No. 12/508,879 filed Jul. 24, 2009, Ser. No. 12/508,915 filed Jul. 24, 2009, and Ser. No. 12/643,471 filed Dec. 21, 2009, the teachings of all of which are incorporated herein in their entireties by reference. The subject matter of this application is also related to U.S. patent application Ser. No. 12/649,490 filed Dec. 30, 2009, Ser. No. 12/722,828 filed Mar. 12, 2010, Ser. No. 12/730,627 filed Mar. 24, 2010, Ser. No. 12/731,631 filed Mar. 25, 2010, Ser. No. 12/767,985 filed filed Apr. 27, 2010, Ser. No. 12/768,058 filed Apr. 27, 2010, Ser. No. 12/769,882 filed Apr. 29, 2010 and Ser. No. 12/769,910 filed Apr. 29, 2010.

BACKGROUND OF THE INVENTION

1. Field of the Invention

The present invention relates to direct access block memory storage devices, and, in particular, to command tracking and conflict checking for solid state disks (SSDs).

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

A hard disk is addressed linearly by logical block address (LBA). A hard disk write operation provides new data to be written to a given LBA. Old data is over-written by new data at the same physical LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate controller chip with firmware, to maintain a record of mappings of each LBA to the current page number where its data is stored. This record mapping is typically managed by a flash translation layer (FTL) in software that might generate a logical-to-physical translation table. The flash translation layer corresponds to the media layer of software and/or firmware controlling an HDD.

Since an HDD or SSD might receive one or more commands such as read, write or erase operations, before a previously received command has completed, a queue might generally maintain a list of commands received while a previous command is being processed. In storage devices operating in accordance with the Small Computer System Interface (SCSI) standard, a control field, such as the SCSI Queue Algorithm Modifier (QAM) field, might be employed to indicate whether reordering of the queue of received commands is permitted. For example, the SCSI Primary Commands specification (SPC-3, Section 7.4.6, pg. 285, 2005, included by reference herein) defines the QAM field. As defined, when the QAM field has a value of zero, command reordering is restricted, and queued commands must be processed in the order in which they are received. When the QAM field has a value of one, command reordering is permitted, and the storage device may process queued commands in any order.

When commands are received, an HDD or SSD might generally perform conflict checking between the received command and any outstanding or queued commands. One solution is to track commands by adding every received command to a linked list. The linked list is searched for conflicts every time a new command is received. Although easy to implement and generally not requiring much memory space, adding every command to a linked list can require a long execution search time when the list of commands is long.

Another solution is to add received commands to a balanced binary tree, sorted by the starting LBA of the command (the search key). A binary tree is a tree data structure in which each parent node has at most two children or subtrees (left and right). Binary trees are commonly implemented with the left subtree of a node containing nodes with search keys less than the parent node's key, and the right subtree of a node containing nodes with search keys greater than the parent node's key. A balanced binary tree is a binary tree where all branches have a predictable depth that can differ by no more than one. The depth of a binary tree is equal to the integer value of $\log_2(n)$, where n is the number of nodes of the tree.

A balanced binary tree can require a large amount of code memory space because it is a relatively complex data structure to maintain. Further, long execution time might be required to add or remove commands from the data structure due to the complex nature of a balanced binary tree. Searches might require long execution time due to the added complexity that commands generally affect ranges of LBAs, not just the starting LBA (i.e. the search key). Therefore, there is a need for command tracking and conflict checking that is easy to implement, does not require much memory space, and provides fast execution time.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide tracking and processing of commands received by a storage device. For each received command, the storage device determines one or more requested logical block addresses (LBAs), including a starting LBA and a length of one or more LBAs of the received command. The storage device determines whether command reordering is restricted. If command reordering is not restricted, the storage device processes the received commands. Otherwise, if command reordering is restricted, the storage device conflict checks each received command. If no conflict is detected, the storage device tracks and processes the received command. Otherwise, if a conflict is detected, the storage device queues the received command.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 14 shows an exemplary small command tracking data structure as employed by the command tracking and conflict checking subroutine of FIG. 12.

DETAILED DESCRIPTION

In accordance with embodiments of the present invention, tracking and conflict checking of outstanding access requests (e.g. host reads/writes/etc.) to a direct access block storage device such as, for example, SSDs, HDDs, or hybrid magnetic and solid state storage systems, are provided. Commands might be tracked and checked for conflicts only when command reordering is restricted, such as indicated by the SCSI Queue Algorithm Modifier (QAM) field. Embodiments of the present invention might provide separate tracking of "large" versus "small" commands. For example, commands accessing more than a predefined number of blocks of the storage device might be considered to be large commands and, thus, be tracked separately than smaller commands. Small commands might be tracked by individual LBAs or by LBA ranges. Exclusive and non-exclusive commands might be allowed to overlap in an LBA range when not affecting the same LBA. A command that is queued for access to one LBA might be allowed to continue for one or more other LBAs that do not have access conflicts. Thus, as will be described herein, embodiments of the present invention might generally provide increased performance of a storage system by providing fast, efficient checks for command conflicts.

Figure 1:
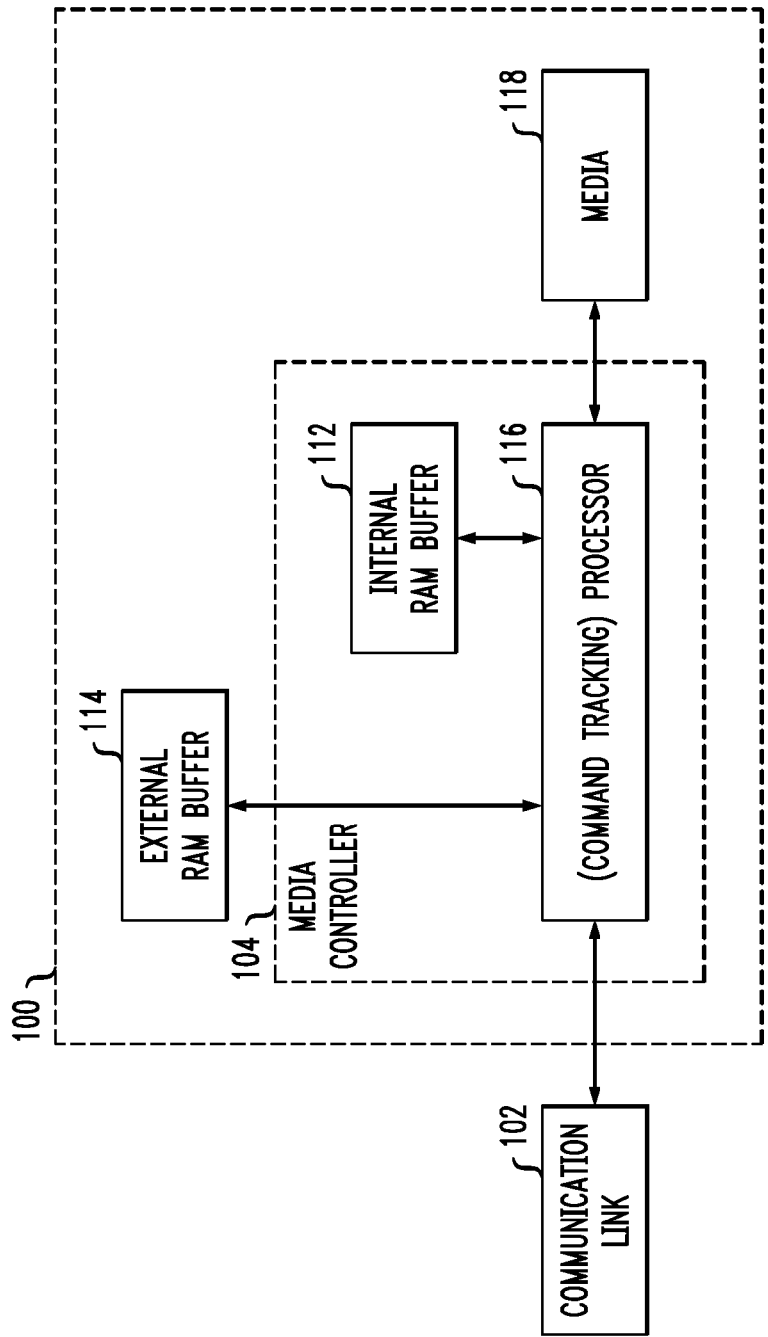
FIG. 1 shows a block diagram of a flash memory storage system implementing logical-to-physical translation in accordance with exemplary embodiments of the present invention.

FIG. 1 shows a block diagram of flash memory storage system 100 implementing a logical-to-physical translation in accordance with exemplary embodiments of the present invention. As shown, flash memory storage system 100 is electrically coupled to communication link 102. Flash memory storage system 100 comprises media controller 104, optional external RAM buffer 114, and flash media 118. Communication link 102 is employed for communication with one or more external devices, such as a computer system or networking device, which interface with flash memory storage system 100. Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, and IEEE 802.16 link, or any other similar interface link for connecting a peripheral device to a computer.

Media controller 104 controls transfer of data between flash media 118 and an external device coupled to communication link 102. Media controller 104 might be implemented as a system-on-chip (SoC). Media controller 104 might include internal RAM buffer 112 and might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between flash media 118 and communication link 102. Processor 116 includes software and/or firmware as needed for operation, including for tracking and conflict checking of outstanding access requests in accordance with exemplary embodiments of the present invention, as described subsequently. Although shown in FIG. 1 as a single processor, processor 116 might be implemented with multiple processors. For embodiments having multiple processors, inter-processor communication might be employed, such as described in related U.S. patent application Ser. No. 12/436,227.

Figure 2:
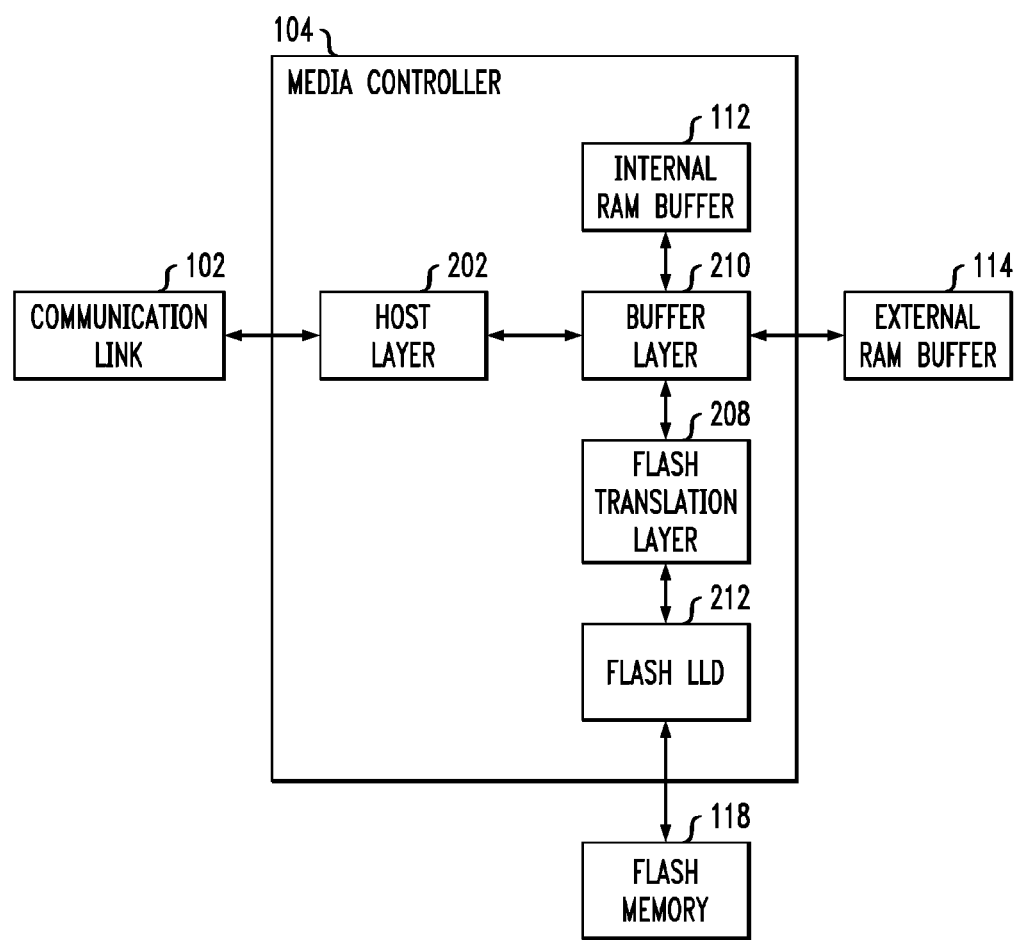
FIG. 2 shows an exemplary functional block diagram of processes employed by the flash memory storage system of FIG. 1.

FIG. 2 shows an exemplary functional block diagram of process modules implemented as software, hardware, or some combination thereof, within processor 116 and media controller 104. As shown in FIG. 2, host layer 202 implements protocols to control flow of data between communications link 102 and media controller 104. For example, host layer 202 might process data access commands from communication link 102 and communicate with flash translation layer (FTL) 208. In embodiments of the present invention, FTL 208 translates the logical-to-physical addresses (and vice-versa) of data stored in flash media 118, for example, by making flash memory storage system 100 appear similar to a conventional HDD. FTL 208 temporarily stores data in a target buffer via buffer layer 210. Buffer layer 210 generally provides an interface between host layer 202 and the target buffer. In general, data transfers between flash media 118 and communication link 102 are buffered in the target buffer that includes at least one of external RAM buffer 114 and internal RAM buffer 112. FTL 208 interfaces with flash media 118 by flash low-level driver 212. Flash low-level driver 212 implements hardware-specific basic read and write operations of flash memory 118, thus, separating the low-level hardware-specific signal and timing requirements of the flash memory circuitry from the functionality of FTL 208. FTL 208 also enables garbage collection, error recovery, and wear-leveling routines for flash media 118. Host layer 202, buffer layer 210 and flash translation layer 208 might include Application Programming Interfaces (APIs), which are protocols or formats used by software to communicate between sub-applications within the software.

For example, media controller 104 receives one or more requests for flash media access, such as read or write operations, from one or more external devices via communication link 102. Such requests for access to flash media 118 generally include at least one logical block address (LBA) where data should be read or written. For example, the requests might be to read from or write to a i) single flash address, ii) a group of contiguous flash addresses, or iii) a group of non-contiguous flash addresses. Received requests are processed by host layer 202. Host layer 202 i) controls host interface-specific commands (e.g. SAS commands), ii) coordinates host-side data transfers and command execution, and iii) processes any other host commands (e.g. status updates). Host layer 202 is in communication with buffer layer 210. FTL 208 translates the LBA into a physical address of the desired data. FTL 208 also interfaces with buffer layer 210. Since data transfers between communication link 102 and flash media 118 are temporally stored in buffer memory, buffer layer 210 generally directs the data traffic between host layer 202 and FTL 208. For example, if an external host (not shown) provides, via communication link 102, data to be written to flash media 118, buffer layer 210 might coordinate temporary storage of the data in buffer 114 until FTL 208 coordinates writing the data to flash media 118. Similarly, if the external host requests to read data from flash media 118, buffer layer 210 might temporarily store the data in buffer 114 until host layer 202 coordinates sending the data to the host via communication link 102.

Figure 3:
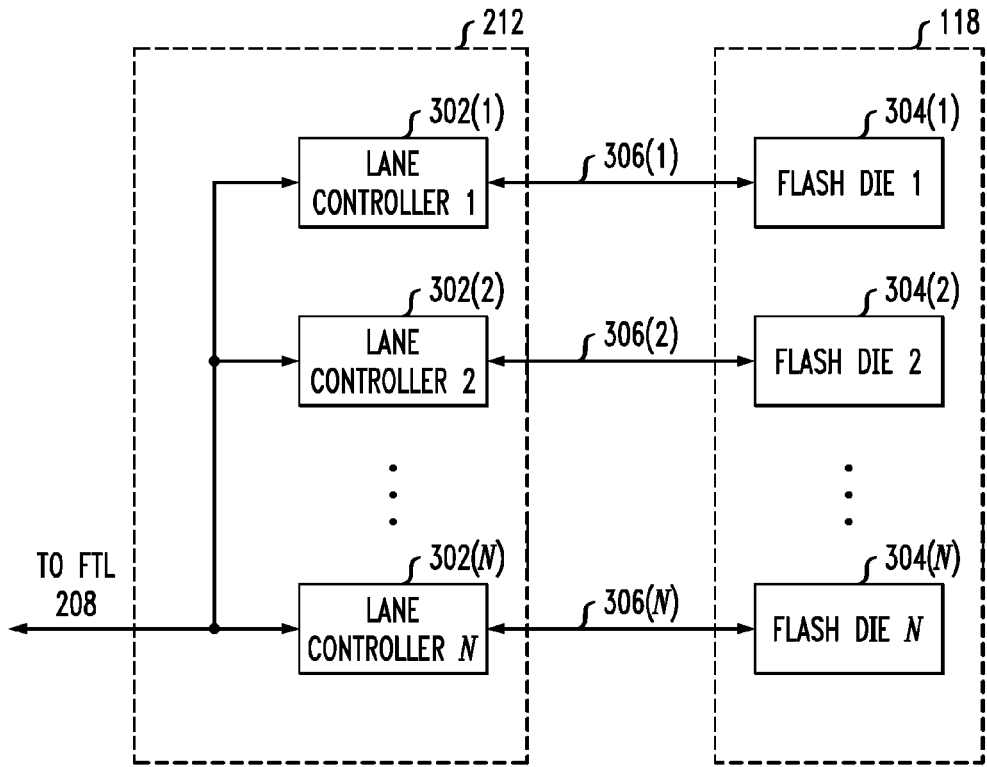
FIG. 3 shows additional detail of the flash memory storage system of FIG. 1.

FIG. 3 shows an exemplary embodiment of flash media 118 and flash low-level driver 212, in accordance with embodiments of present invention. As shown, flash media 118 might include one or more physical silicon dies, shown as flash dies 304(1) through 304(N). As shown, each flash die is in communication with flash low-level driver 212 via a "lane", shown as lanes 306(1) through 306(N). Additionally, flash low-level driver 212 includes one or more lane controllers, shown as lane controllers 302(1) through 302(N), corresponding to each lane and flash die. For example, flash dies 304(1) through 304(N) might be configured such that data is "striped" across two or more dies analogously to hard drives in a redundant array of independent disks (RAID), with each die 304(1) through 304(N) corresponding to a wear-level unit. Alternatively, embodiments of the present invention might configure each flash die 304(1) through 304(N) as a separate, stand-alone flash memory device without data striping.

Figure 4:
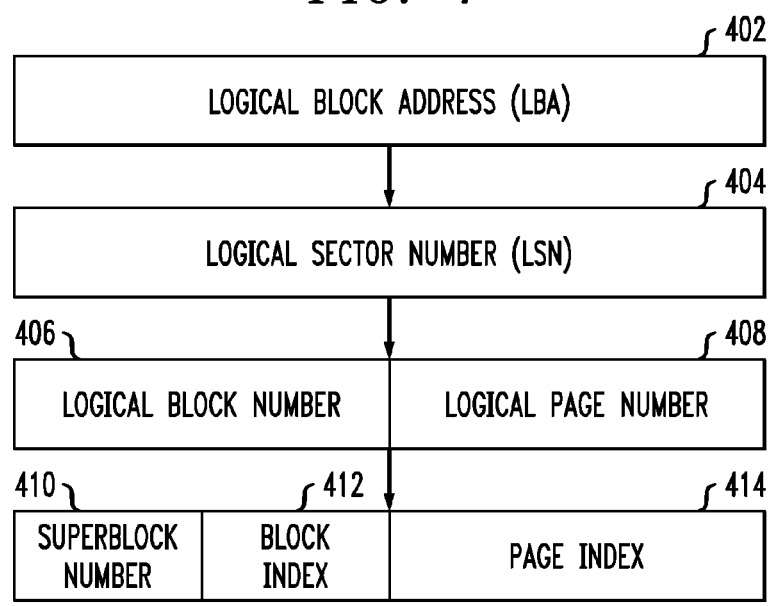
FIG. 4 shows an exemplary relation of a logical address of data to a physical address of data as managed by a flash translation layer of the flash memory storage system of FIG. 1 operating in accordance with embodiments of the present invention.

FIG. 4 shows an exemplary relation of a logical address of data (LBA 402) to a physical address of data (Superblock number 410, Block index 412 and Page Index 414) as managed by FTL 208 of FIG. 2. A Superblock generally is a logical collection of blocks representing a fixed range of LBAs. As described previously with regard to FIG. 2, when a host device requests access to flash media 118, the request generally includes a logical block address (LBA), which FTL 208 translates into a physical address of the desired data. As shown in FIG. 4, LBA 402 corresponds to at least one logical sector number (LSN) 404. LSN 404 corresponds to the smallest writable unit of a host device coupled to communication link 102. For example, LSN 404 generally might correspond to a sector size of 512 bytes, which is the typical sector size for traditional hard drives (HDDs). Logical-to-physical and physical-to-logical address translation might be performed as described in related U.S. patent application Ser. No. 12/643,471.

Figure 5:
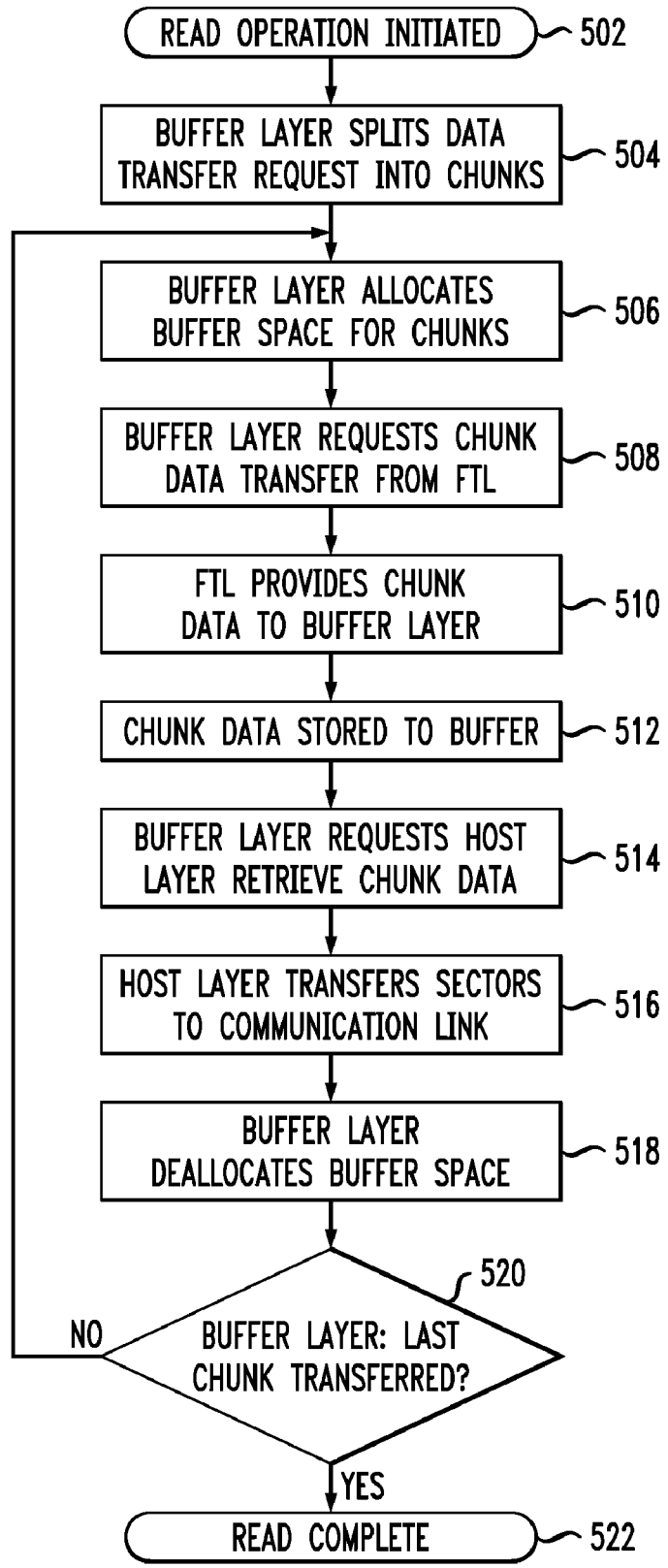
FIG. 5 shows a flow diagram of a media read operation performed by a buffer layer of the flash memory storage system of FIG. 1 operating in accordance with exemplary embodiments of the present invention.

FIG. 5 shows a system-level flow diagram of media read operation 500 performed generally by buffer layer 210 of flash memory storage system 100 of FIG. 1. As shown in FIG. 5, media read operation 500 might be a request to read one or more addresses of flash media 118. Read requests for one or more contiguous addresses of flash media 118 might be processed substantially the same as described in greater detail in related U.S. patent application Ser. No. 12/643,471. Read requests for one or more non-contiguous addresses might be processed as described in related U.S. patent application Ser. No. 12/508,915. As shown in FIG. 5, buffer layer 210 responds to a read request from host layer 202 at step 502. At step 504, buffer layer 210 might segment the read into smaller internal data transfers ("chunks"). Each chunk corresponds to a predefined number of LBAs ("sectors"). A starting LBA is retained with each chunk to identify the sectors corresponding to the chunk. A chunk boundary exists between the last LBA of one chunk and the first LBA of the next chunk. Embodiments of the present invention employ a chunk size that is substantially equal to the page size of flash media 118 (for example, $2^N$ bytes, where N is an integer). Thus, for example, a read operation might include multiple contiguous chunks (e.g. chunks having contiguous LBAs).

At step 506, buffer layer 210 allocates buffer space for one or more chunks in the current segment of the read operation for which data is to be read. Buffer layer 210 might allocate buffer space for the entire read and transfers all of the chunks from flash media 118. At step 508, buffer layer 210 requests data from FTL 208, corresponding to at least a portion of the data requested by the read request received at step 502, to be transferred from flash media 118. At step 510, FTL 208 provides the chunk data to buffer layer 210 and, at step 512, buffer layer 210 temporarily stores the data in buffer 114. At step 514, buffer layer 210 requests that host layer 202 retrieve the chunk data stored in buffer 114 at step 512. At step 516, host layer 202 transfers the chunk data to communication link 102. At step 518, buffer layer 210 deallocates the space in buffer 114 that was allocated in step 506 for the current group of one or more chunks. At step 520, if there are more chunks to transfer, processing returns to step 506 for buffer layer 210 to allocate buffer space for the next group of one or more chunks to be processed. If there are no more chunks to be transferred, processing continues to step 522, where the read operation ends.

As will be described in greater detail with regard to FIG. 7, FIG. 8 and FIG. 9, embodiments of the present invention might perform host-side operations, for example steps 514 and 516 of FIG. 5, for a first group of one or more chunks, and media-side operations, for example steps 508-512 of FIG. 5, for a subsequent group of one or more chunks, in parallel. For example, by segmenting the read operation into chunks, a first set of chunks might be transferred between FTL 208 and buffer layer 210 (step 510), and host layer 202 might then transfer the first set of chunks to communication link 102 (step 516). Concurrently with one or more of the host-side operations for the first set of chunks, a second set of chunks for the same read operation might be transferred from FTL 208 to buffer layer 210 (step 510), and so on, until all chunks for the read operation are transferred. Thus, embodiments of the present invention provide the ability to perform host side and media side transfers in parallel.

Figure 6:
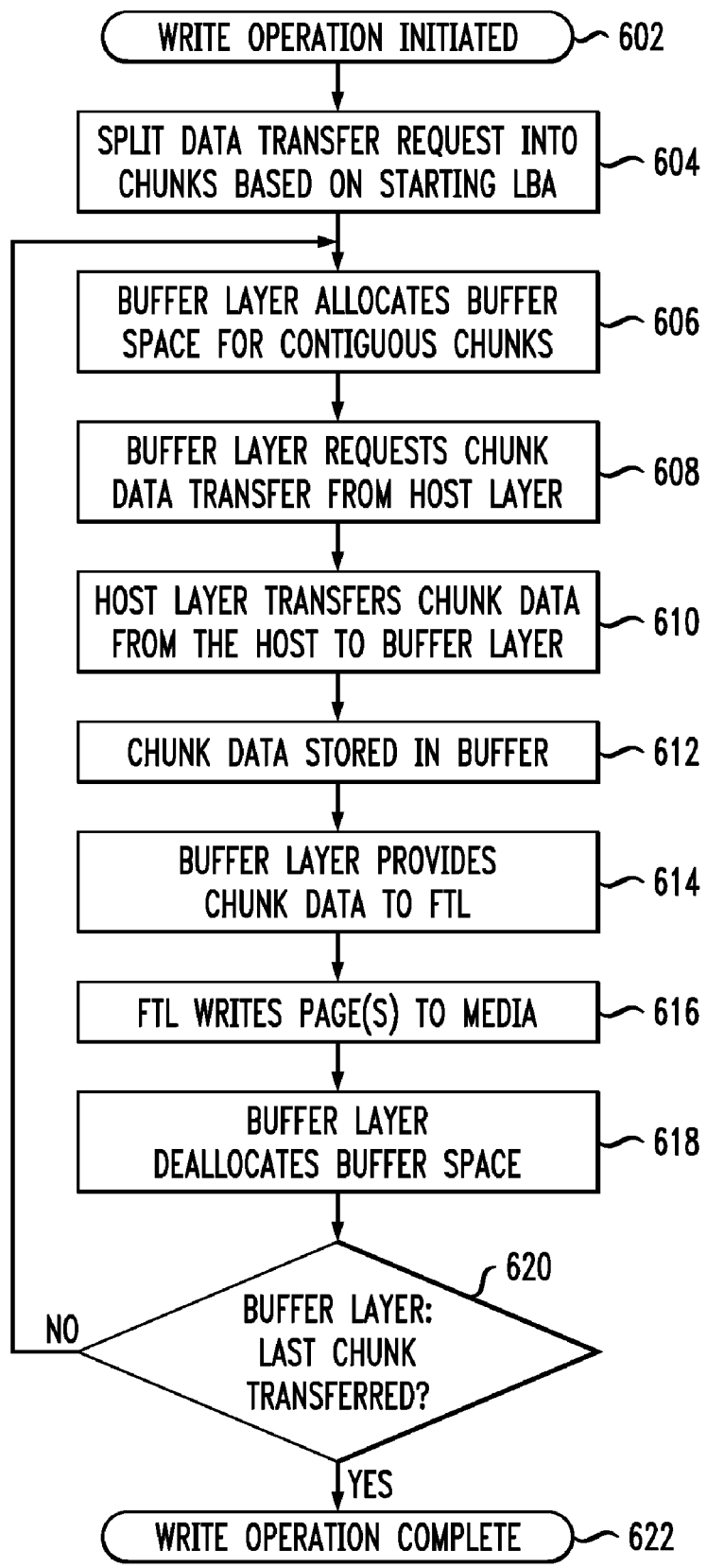
FIG. 6 shows a flow diagram of a media write operation performed by a buffer layer of the flash memory storage system of FIG. 1 operating in accordance with exemplary embodiments of the present invention.

FIG. 6 shows a flow diagram of a media write operation performed generally by buffer layer 210 of flash memory storage system 100 of FIG. 1. As shown in FIG. 6, media write operation 600 might be a request to write one or more contiguous addresses of flash media 118. Write requests for one or more contiguous addresses of flash media 118 might be processed substantially the same as shown in FIG. 6, and as described in greater detail in related U.S. patent application Ser. No. 12/643,471. Write requests for one or more non-contiguous addresses might be processed as described in related U.S. patent application Ser. No. 12/508,915. As shown in FIG. 6, at step 602, host layer 202 (FIG. 2) responds to a write request from communication link 102. At step 604, buffer layer 210 groups the sectors of the write operation into chunks based on the starting LBA. At step 606, buffer layer 210 allocates buffer space for chunks of the write operation being processed. At step 608, buffer layer 210 requests the data for the current chunks from host layer 202. At step 610, host layer 202 transfers the chunk data to buffer layer 210, and, at step 612, buffer layer 210 stores the chunk data in buffer 114.

At step 614, buffer layer 210 provides data for the one or more chunks to FTL 208. At step 616, FTL 208 writes one or more pages of the chunk data to flash media 118. At step 618, buffer layer 210 deallocates the space in buffer 114 allocated at step 606 for the current chunks. At step 620, if there are additional chunks having data to be written, processing returns to step 606. If there are no additional chunks to be written, at step 622, the write operation is ended. As described above with regard to the read operation of FIG. 5, and as will be described in greater detail with regard to FIG. 7, FIG. 8 and FIG. 9, embodiments of the present invention might perform host-side operations, for example steps 608-612 of FIG. 6, for a first group of one or more chunks, and media-side operations, for example steps 616 and 618 of FIG. 6, for a subsequent group of one or more chunks, in parallel.

Figure 7:
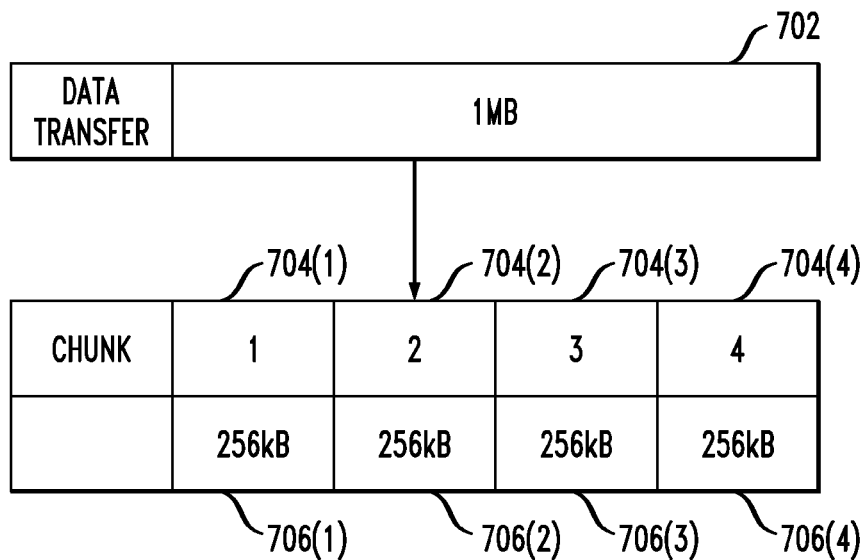
FIG. 7 shows a block diagram of internal segmentation of large data transfers employed by the flash memory storage system of FIG. 1.

FIG. 7 shows an exemplary data transfer, 702, for 1 MB of data. Data transfer 702 might be a host-side data transfer (e.g. a flash write operation) of data to be written from a device coupled to communication link 102 (FIG. 1) to flash media 118, or data transfer 702 might be a media-side data transfer (e.g. a flash read operation) of data read from flash media 118 to be provided to one or more devices coupled to communication link 102. For data transfers larger than a predetermined threshold, buffer layer 210 (FIG. 2) might segment host-side media request 702 into smaller into smaller internal data transfers. For the example of FIG. 7, buffer layer 210 might split data transfer 702 into four smaller data transfers shown as chunks 704(1)-704(4). As shown in the example of FIG. 7, the predetermined threshold is 256 kB, thus, data transfer 702 is divided into four 256 kB chunks, but other threshold values might be employed. As shown, each of chunks 704(1)-704(4) corresponds to 256 kB segments 706(1)-706(4) of data transfer 702. The maximum size of the chunks is determined by the size of the physical buffers, shown in FIG. 8.

Figure 8:
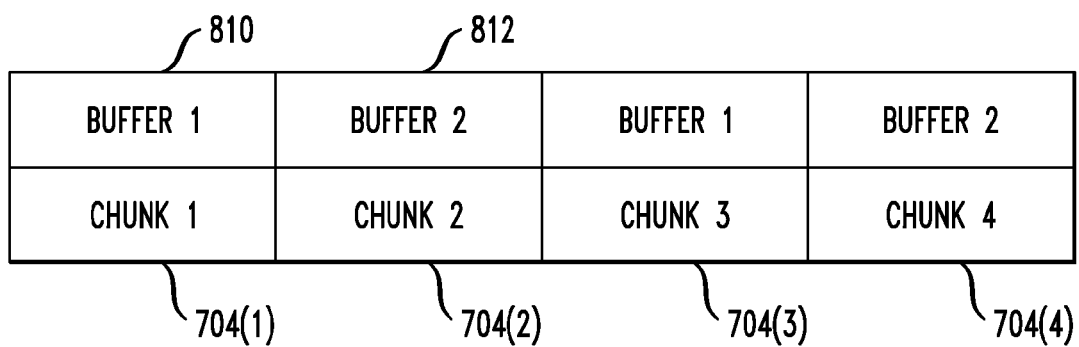
FIG. 8 shows a virtual circular buffer employed for media read and media write operations in accordance with exemplary embodiments of the present invention.

FIG. 8 shows exemplary virtual circular buffer 800. Virtual circular buffer 800 might be controlled by buffer layer 210 (FIG. 2), and might be located in at least one of internal RAM buffer 112 and external RAM buffer 114 (FIG. 1). As shown, virtual circular buffer 800 might include two physical buffers, shown as buffer1 810 and buffer2 812. In embodiments of the present invention, the number of physical buffers employed by virtual circular buffer 800 might be selectable. For example, if media controller 104 is under relatively low workload for large data transfers, buffer layer 210 might allocate an additional physical buffer (for example, a "buffer3") to virtual circular buffer 800. The advantage of allocating an additional physical buffer is higher utilization of the buffer hardware (FIG. 1) and software engines (FIG. 2). Buffer1 810 and buffer2 812 are configured to temporarily store data chunks 704(1)-704(4) as described subsequently.

Figure 9:
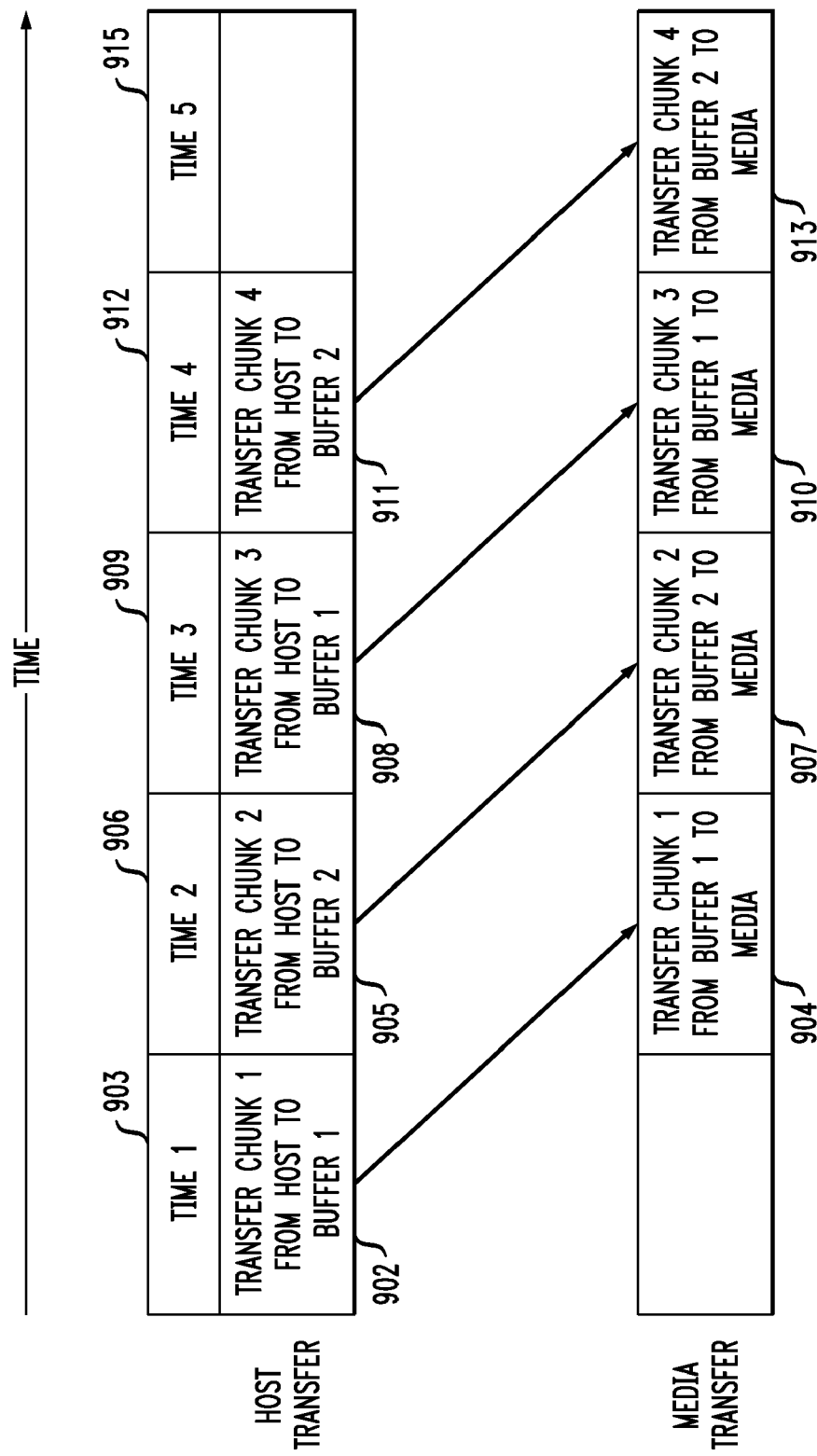
FIG. 9 shows a timing diagram of a media write operation employing the buffer of FIG. 8.

FIG. 9 shows a timing diagram of a write operation employing virtual circular buffer 800. As host transfer 902 provides chunk1 704(1) to buffer1 810 at time1 903, media transfer 904 is queued for chunk1 704(1). At time2 906, when the host transfer for chunk1 704(1) is complete, media transfer 904 starts providing chunk1 704(1) to flash media 118 (FIG. 1). In parallel with media transfer 904, host transfer 905 for the next chunk, chunk2 704(2), is provided to buffer2 812. When media transfer 904 is complete, buffer1 810 is freed to receive the next chunk, chunk3 704(3), by host transfer 908 at time3 909. In parallel with host transfer 908, once host transfer 905 is complete, media transfer 907 provides chunk2 704(2) to flash media 118, and so on, until all chunks of the data transfer are processed.

In some embodiments of the present invention, a physical buffer (e.g. buffer1 810 and buffer2 812) is reused within virtual circular buffer 800 as soon as the buffered data is transferred to its destination (for example, flash media 118 in the example of FIG. 9). This minimizes the effect of large data transfers on the buffer space available in buffers 112 and 114 for other operations of media controller 104. Alternatively, media controller 104 might be configured to replace the physical buffers of virtual circular buffer 800 with alternate physical buffers in between handling of chunks for a large data transfer. This might allow buffer layer 210 flexibility in configuring and allocating buffer space such as, for example, selectably increasing or decreasing the number of physical buffers for a virtual circular buffer, as described with regard to FIG. 8.

Embodiments of the present invention provide multiple virtual circular buffers (e.g. virtual circular buffer 800 of FIG. 8) operating simultaneously to support parallel processing of multiple large data transfers. For example, referring back to FIG. 3, buffer layer 210 employing N virtual circular buffers allows processing of multiple large data transfers in parallel because data is transferred in parallel between the N virtual circular buffers and the N flash dies 304(1)-304(N). Further, the number of virtual circular buffers in operation might be selectable by buffer layer 210. For example, if media controller 104 is under a heavy workload for large data transfers, buffer layer 210 might allocate an additional virtual circular buffer to provide parallel processing of the large data transfers. Virtual circular buffers are useful for skip-read and skip-write operations, such as described in related U.S. patent application Ser. No. 12/508,915.

Embodiments of the present invention provide tracking and conflict checking of outstanding access requests (e.g. host reads/writes/etc.) to a storage device (e.g. flash media 118). As described herein, commands are received by media controller 104 from one or more host devices in communication with communication link 102. In general, a queue of received commands is maintained. Received commands generally include a starting logical block address (LBA) and a range of LBAs for the command. In general, a write command might require exclusive access to the LBAs affected by the command. Read commands might request exclusive access to the LBAs affected by the command, or might request non-exclusive access to the LBAs affected by the command. When read commands are non-exclusive, one or more read commands might simultaneously access a given LBA.

Figure 10:
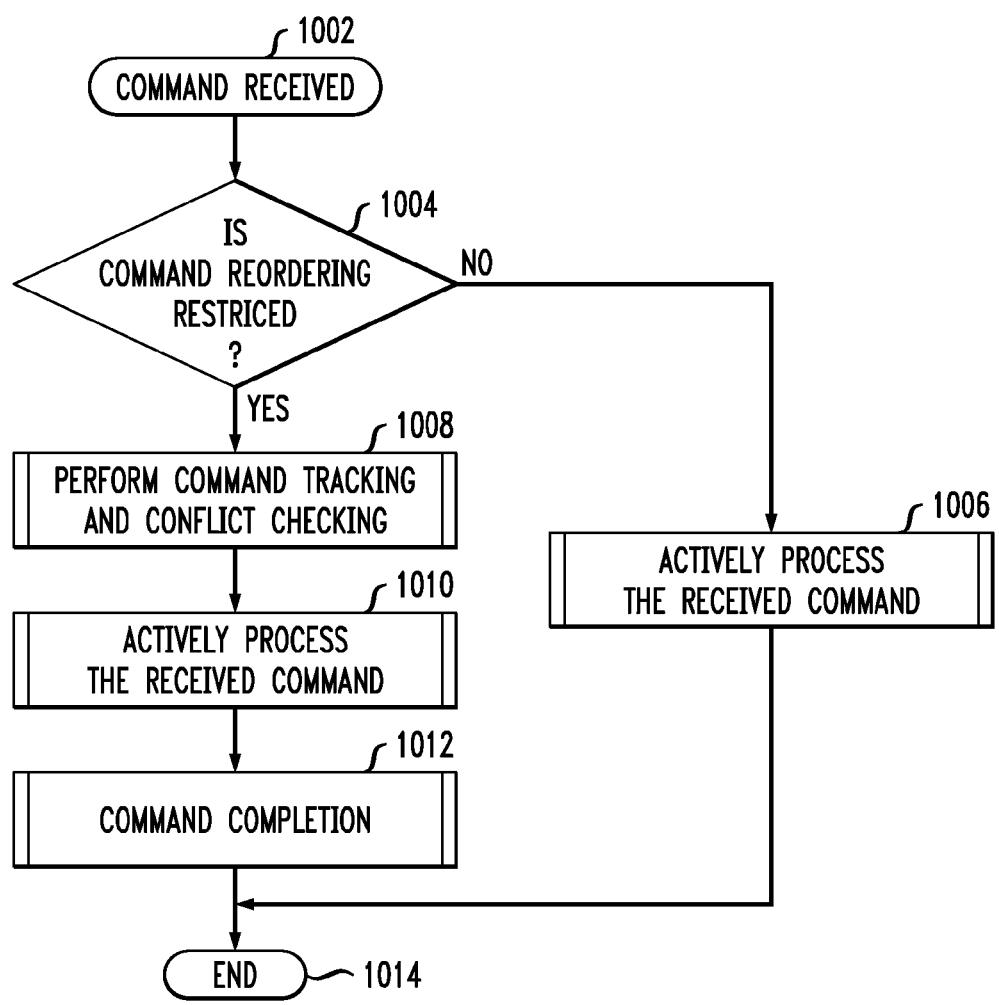
FIG. 10 shows a flow diagram of a command execution routine, in accordance with embodiments of the present invention.

FIG. 10 shows a flow diagram of command processing routine 1000, which is generally performed by media controller 104 for received commands. At step 1002, a command is received by media controller 104 from a host device in communication with communication link 102. The command might be, for example, a read or write operation. At step 1004, the SCSI Queue Algorithm Modifier (QAM) field of the received command is checked to determine whether reordering of the received command is permitted. As described herein, the SCSI QAM field is employed to control whether: i) the target storage device performs queued commands in the order the commands are received, or ii) the target storage device may re-order the execution sequence of the queued commands.

At step 1004, if the SCSI QAM field is set such that command reordering is permitted, the received command is actively processed at step 1006. Embodiments of the present invention do not track potential command conflicts when command reordering is permitted. Step 1006 might process active commands substantially similarly as described with regard to FIG. 5 for read commands, and FIG. 6 for write commands. When all received commands have been processed at step 1006, command processing routine 1000 ends at step 1014.

At step 1006, since command reordering is allowed and command tracking is not necessary, the received command will be completed as soon as possible. In general, embodiments of the present invention might maintain a list of all active commands. When command reordering is permitted, all active commands proceed toward completion as quickly as possible without regard to the order in which the commands were received. For example, as described herein, one or more commands might be processed in parallel. For example, as described with regard to FIG. 3, portions of one or more commands might be completed in parallel where one or more flash dies are employed in parallel. As described with regard to FIGS. 7-9, host-side and media-side operations for one or more commands might be processed in parallel. Further, the chunks of data described with regard to FIGS. 7-9 could be interleaved chunks corresponding to one or more commands. Alternatively, two or more small commands might be combined into one larger command.

If, at step 1004, the SCSI QAM field is set such that command reordering is restricted, command tracking and conflict checking process 1008 is performed. Command tracking and conflict checking process 1008 is described with regard to FIG. 11. Once command tracking and conflict checking is complete, active commands are processed at step 1010. Step 1010 might be performed in substantially the same manner as step 1006, with the exception that one or more commands might be queued due to a conflict with a prior command. When an active command is completed, command completion process 1012 is performed. Command completion process 1012 is described with regard to FIG. 13. When a received command has been completed, command processing routine 1000 ends at step 1014.

FIG. 10 generally shows embodiments of a process for handling a single received command. In general, a new command might be received at any time, and command processing routine 1000 might be initiated by a firmware interrupt when a new command is received. As described herein, one or more commands might be actively processed at one time, and one or more commands might be queued. As described in greater detail with regard to FIG. 13, one or more commands might iteratively be processed by steps 1010 and 1012. In embodiments of the present invention, steps 1008 and 1012 might generally be performed by buffer layer 210 to facilitate allocation and management of buffer space for active commands.

Figure 11:
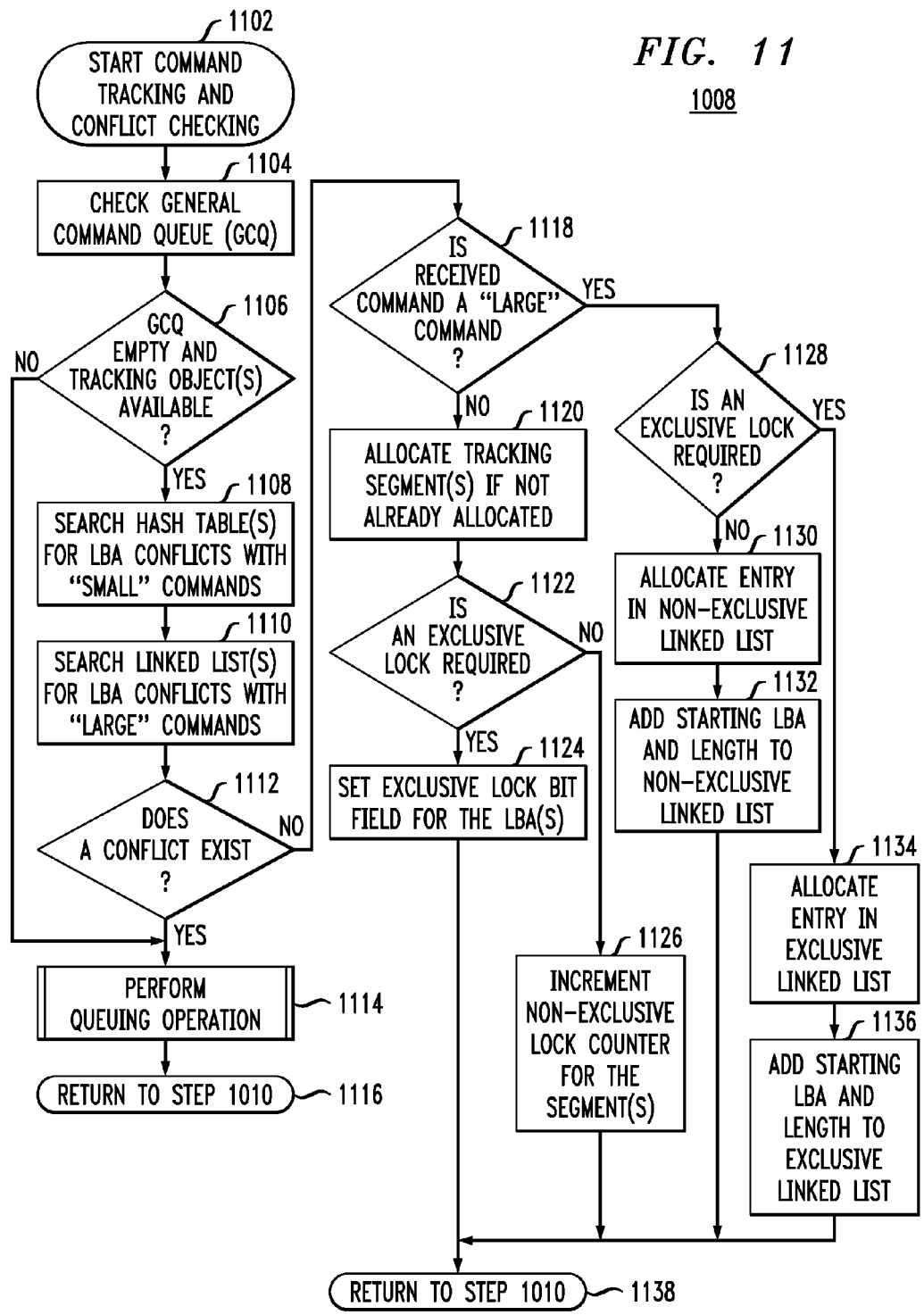
FIG. 11 shows a flow diagram of a command tracking and conflict checking subroutine of the command execution routine of FIG. 10.
Figure 12:
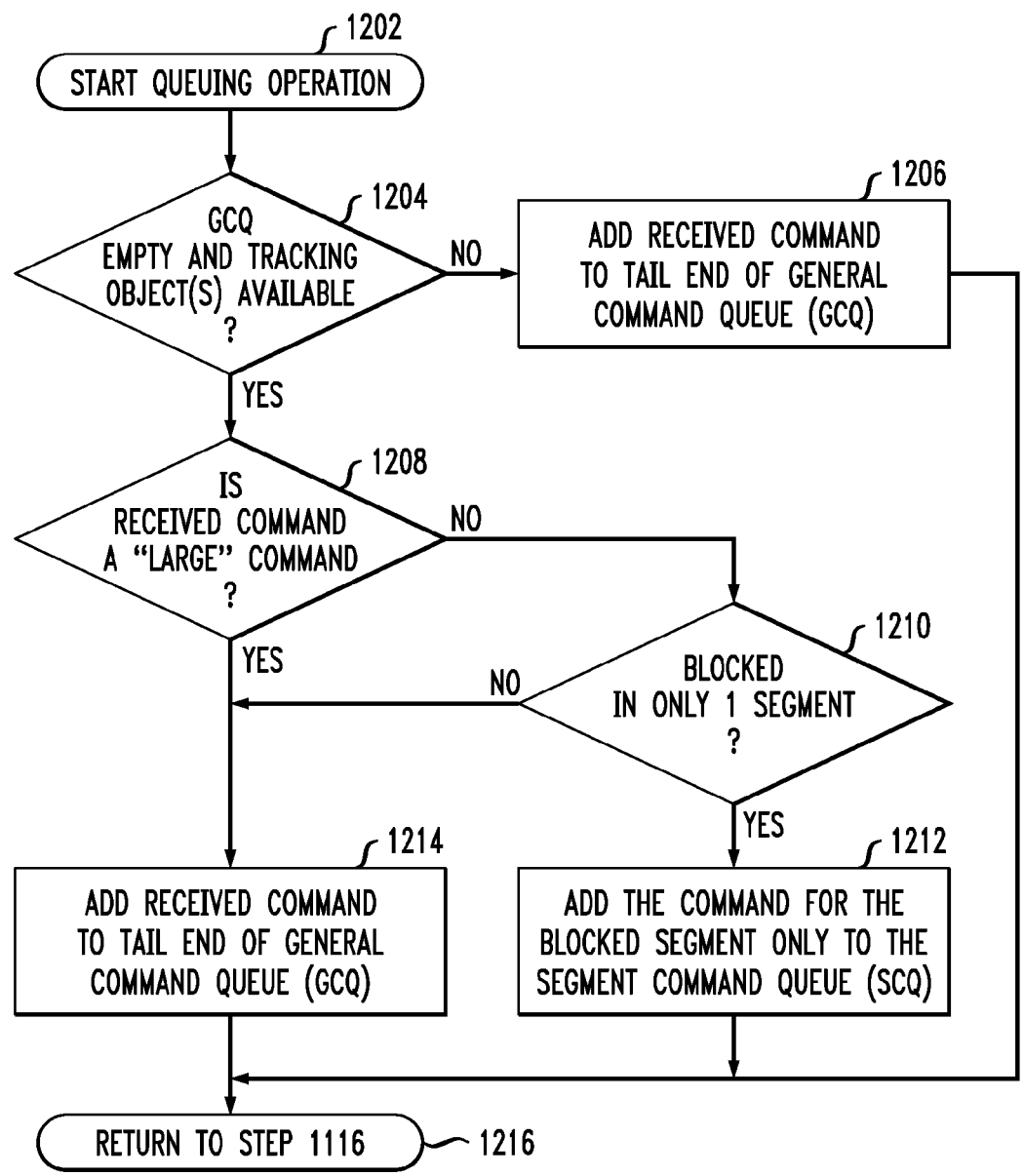
FIG. 12 shows a flow diagram of a queuing operation subroutine of the command tracking and conflict checking subroutine of FIG. 11.
Figure 13:
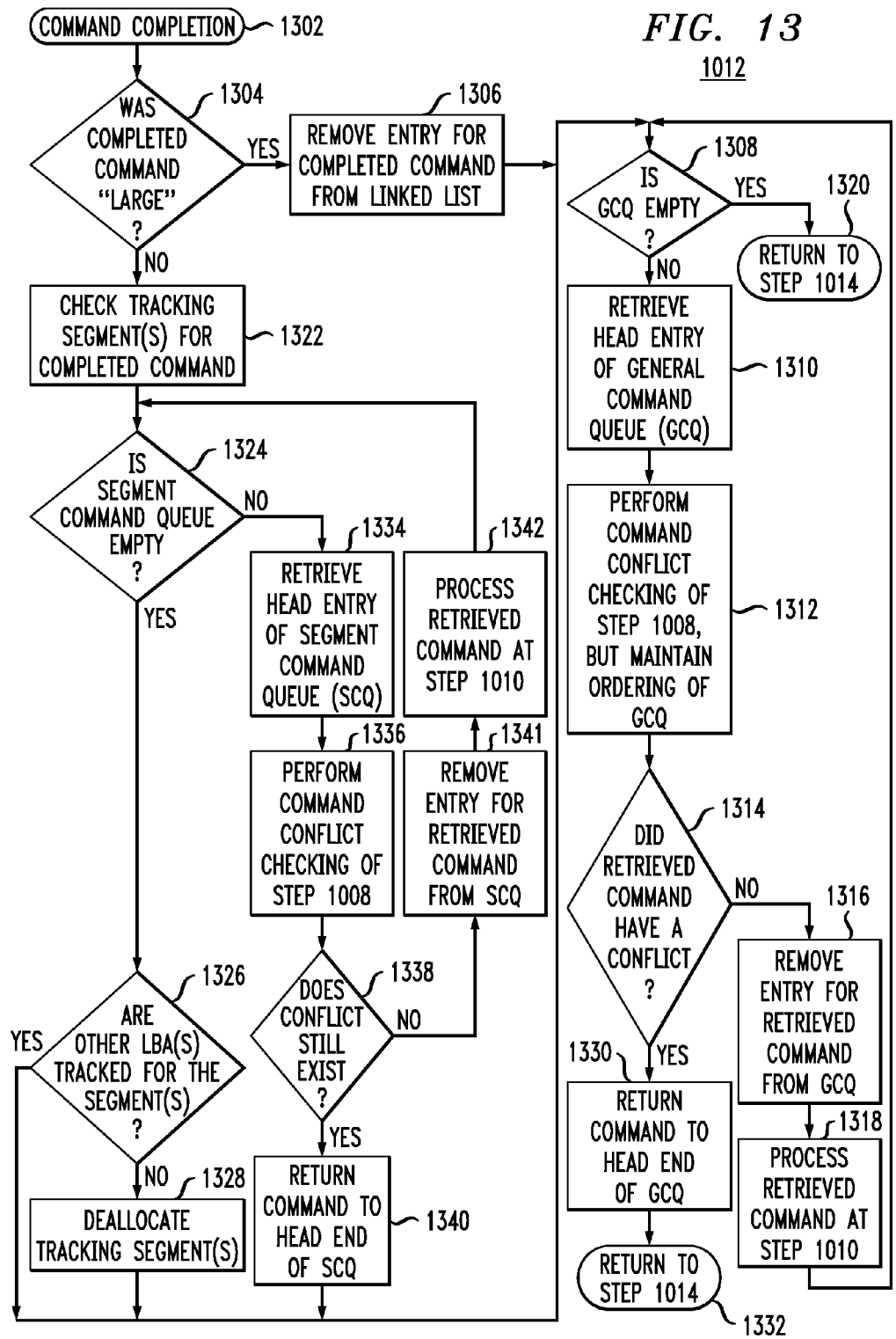
FIG. 13 shows a command completion subroutine of the command tracking and conflict checking subroutine of FIG. 10.
Figure 15:
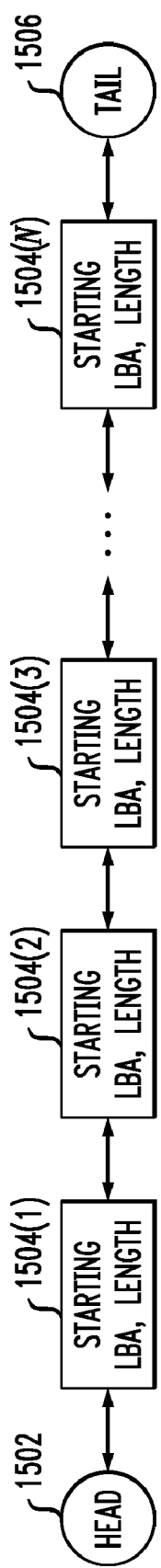
FIG. 15 shows an exemplary large command tracking data structure as employed by the command tracking and conflict checking subroutine of FIG. 12.

FIG. 11 shows an exemplary embodiment of command tracking and conflict checking process 1008 of FIG. 10. FIG. 12 shows an exemplary embodiment of the queuing operation of step 1114 of FIG. 11. FIG. 13 shows an exemplary embodiment of command completion operation 1012 of FIG. 10. FIGS. 14 and 15 show exemplary command tracking data objects employed by the command tracking and conflict checking process shown in FIG. 11.

FIG. 14 shows a first state (State 1) and a second state (State 2) of exemplary command tracking segments 1402 and 1404. Command tracking segments 1402 and 1404 include bit fields corresponding to each LBA in the range of LBAs tracked by the segment. For example, as shown, command tracking segment 1402 has a starting LBA of 0x3080 and includes bit fields 1402(1)-1402(128). Each bit field 1402(1)-1402(128) corresponds to one block in the 128 block range of command tracking segment 1402 (i.e. the 128 blocks from 0x3080 to 0x30FF). Similarly, command tracking segment 1404 has a starting LBA of 0x3100 and includes bit fields 1404(1)-1404 (128). Each bit field 1404(1)-1404(128) corresponds to one block in the 128 block range of command tracking segment 1404 (i.e. the 128 blocks from 0x3100 to 0x317F). One or more tracking segments such as 1402 and 1404 might be stored in registers of a microprocessor of media controller 104, for example, processor 116. The starting LBA of tracking segments such as 1402 and 1404 is beneficially a multiple of the number of blocks in a segment to provide efficient tracking of LBAs.

Embodiments of the present invention might employ one or more command tracking segments such as shown in FIG. 14 to track conflicts for "small" commands. A "small" command might be any command that requests access to less than a predetermined number of LBAs, for example, 128 or fewer LBAs. A "small" command can have up to two command tracking segments, depending on the alignment of the starting LBA within the first command tracking segment (e.g. 1402), since in embodiments of the present invention the maximum number of blocks for a "small" command matches the size of the command tracking segments.

In embodiments of the present invention, the total number of command tracking segments available might be selected to support the maximum queue depth of media controller 104.

The queue depth is the maximum number of active commands allowed at one time in media controller 104. Thus, embodiments of the present invention having a queue depth of 32 might generally employ 64 total tracking segments, to support a worst case where all 32 active operations are small operations that span 2 tracking segments each, and no two commands are tracked by the same segment. Embodiments of the present invention might alternatively employ fewer tracking segments and queue commands that cannot be allocated a tracking segment.

In general, write commands require exclusive access to an LBA, while read commands do not necessarily require exclusive access. Non-exclusive locks allow multiple read commands to access the same LBA. Embodiments of the present invention might generally employ one or more command tracking segments such as shown in FIG. 14 to track "small" commands requiring exclusive locks to the LBAs affected by the command. For example, any of bit fields 1402(1)-1402(128) and 1404(1)-1404(128) of command tracking segments 1402 and 1404, respectively, that are equal to 1, might indicate that the corresponding LBA is locked by an active exclusive access command. Any of bit fields 1402(1)-1402(128) and 1404(1)-1404(128) set to 0 might indicate that no active exclusive access command exists for that LBA.

In embodiments of the present invention, tracking segments, such as 1402 and 1404, might be managed in a hash table sorted by starting LBA of each tracking segment. As described in greater detail with regard to FIGS. 11 and 12, when a command is received, the one or more tracking segments in the hash table might be checked for conflicts between the received command and prior commands. If no conflict is detected, the affected bit fields 1402(1)-1402(128) and 1404(1)-1404(128) of command tracking segments 1402 and 1404, respectively, are updated and the received command is processed. As will be described in greater detail in regard to FIG. 12, if a conflict is detected, the received command might be added to a queue. The conflict check for a "small" command can be performed quickly for a given LBA range because the tracking segments can be easily located via the hash table based on the starting LBA. Although all LBAs of media 118 can tracked using tracking segment objects, in embodiments of the present invention only a limited number are tracked at one time, which allows the tracking of "small" commands to make efficient use of memory space.

FIG. 14 also shows an exemplary case of tracking segments 1402 and 1404 being updated between a first state (State 1) and a second state (State 2) when an exclusive lock command is received. As shown in State 1, tracking segment 1402 tracks exclusive locks in bit fields 1402(2) and 1402(3), which correspond to LBAs 0x3081 and 0x3082. In State 1, tracking segment 1404 tracks exclusive locks in bit fields 1404(6) and 1404(125)-1404(128), which correspond to LBAs 0x317C and 0x307F. The other LBAs in the range of tracking segments 1402 and 1404 are not affected by active exclusive lock commands. At State 1, a "small" command is received that requests exclusive access to LBAs 0x30FA-0x3102. This LBA range corresponds to bit fields 1402(123)-1402(128) and 1404(1)-1404(3). As will be described in greater detail with regard to FIGS. 11 and 12, when the command is received, tracking segments 1402 and 1404 are checked for conflicts. As shown in the exemplary case of FIG. 14, no conflicts exist for the LBA range of the received command. Thus, in State 2, the bit fields corresponding to the LBAs affected by the received command are updated to allow the received command to be actively processed. As shown in State 2, bit fields 1402(123)-1402(128) and 1404(1)-1404(3) are updated to reflect the received command for LBAs 0x30FA-0x3102. LBAs that are not affected by the received command are unchanged between States 1 and 2.

Although not shown in FIG. 14, a non-exclusive lock counter might be employed to track "small" commands requiring non-exclusive locks to the LBAs affected by the command. In some embodiments of the present invention, the non-exclusive lock counter might track non-exclusive commands for the overall range of the respective tracking segment, rather than for each individual LBA. In such an embodiment, a command requiring an exclusive lock cannot access an LBA in the range of the tracking segment until the non-exclusive lock counter is equal to 0 (i.e. no other commands are active in the LBA range). In other embodiments of the present invention, each LBA included in a tracking segment might have a corresponding non-exclusive lock counter, which allows one or more exclusive locks and one or more non-exclusive locks to occur in the LBA range covered by the tracking segment, so long as an exclusive lock does not overlap with any other commands. As will be described in greater detail in regard to FIG. 12, commands that encounter a conflict are queued.

FIG. 15 shows an exemplary command tracking data structure for tracking "large" commands. "Large" commands are commands that request access to greater than a predefined number of LBAs. As described with regard to "small" commands, in embodiments of the present invention a "large" command is a command that affects more than 128 LBAs. As shown in FIG. 15, "large" commands are tracked in "large" command list 1500. As shown, "large" command list 1500 is a doubly linked list, meaning that each node links to the next node and the previous node. "Large" command list 1500 includes tracking entries 1504(1)-1504(N) for each "large" command that is active in media controller 104. As shown, tracking entries 1504(1)-1504(N) include the starting LBA and command length (in blocks) for each active "large" command. Although shown in FIG. 15 as having a head end 1502 and a tail end 1506, embodiments of the present invention generally do not maintain an order of entries in "large" command list 1500. Rather, list 1500 tracks a received "large" command might receive the next available one of tracking entries 1504(1)-1504(N). Embodiments of the present invention might employ a first "large" command list to track commands requiring exclusive access to the affected LBAs, and a second "large" command list to track commands allowing non-exclusive access to the affected LBAs.

Embodiments of the present invention might employ a general command queue (GCQ) to queue, if necessary, received commands. The GCQ might generally have a structure similar to the linked list shown in FIG. 15, however, the GCQ maintains the order of received commands. In embodiments of the present invention, the GCQ is a first-in, first-out (FIFO) queue. The GCQ might generally serve as a list of all queued commands for media controller 104. As will be described in greater detail with regard to FIGS. 11-13, commands stored in the GCQ are processed in the order they are received.

Embodiments of the present invention might also maintain a segment command queue (SCQ) corresponding to each tracking segment. The SCQ might be implemented substantially similarly as the GCQ, but might support fewer entries. The SCQ might generally be employed to queue "small" commands separately from "large" commands and "small" commands that would require the re-allocation of tracking segments for use with new ranges of LBAs. Further, the SCQ allows for one or more commands to be queued in only one segment, while still being actively processed in other segments. Thus, the efficiency of processing "small" commands might be increased.

Referring back to FIG. 11, an exemplary embodiment of command tracking and conflict checking process 1008 of FIG. 10 is shown. Command tracking and conflict checking process 1008 starts at step 1102. At step 1104, the general command queue (GCQ) is checked. At step 1106, if the GCQ is not empty (i.e. one or more commands are in the queue) and no conflict tracking data objects are available to track the current command, processing continues to step 1114. At step 1114, the current command is added to a command queue. Queuing operation 1114 is described in greater detail with regard to FIG. 12. Once queuing operation 1114 is complete for the received command, at step 1116, processing returns to step 1010 to process active commands. As described with regard to FIG. 13, processing of queued commands occurs as conflicting prior commands are completed. At step 1106, if the GCQ is empty and conflict tracking data objects are available for use with the current command, processing continues to step 1108. At steps 1108 and 1110, the command tracking data objects are checked for conflicts between previously received commands and the current command.

At step 1108, the hash table of "small" command tracking segments is searched for conflicts between the received command and any prior "small" commands. As described herein, a received command generally includes a starting LBA and a length of the command. Based on the starting LBA and length, the hash table of "small" command tracking segments can be searched to determine if a tracking segment, such as shown in FIG. 14, has been allocated for any LBAs affected by the received command. If a tracking segment has been allocated for one or more of the LBAs affected by the received command, the segment command queue (SCQ) corresponding to the tracking segment is checked. If prior commands are queued for the LBAs of the tracking segment, the received command is added to the tail end of the SCQ. Otherwise, if no commands are queued for the LBAs of the tracking segment, the bit fields of the affected LBAs are checked for conflicts between the received command and any prior exclusive commands. For write operations, the non-exclusive lock counter corresponding to the affected LBAs is also checked to determine whether conflict exists. In embodiments of the present invention, for read operations, the non-exclusive lock counter might not be checked. Alternatively, the non-exclusive lock counter might be checked to determine whether a maximum number of allowed non-exclusive commands has been exceeded.

At step 1110, the "large" command lists are searched for conflicts between the received command and any prior "large" commands. As shown in FIG. 15, the "large" command lists include the starting LBA and length of each active "large" command. Thus, the "large" command lists can be searched for entries affecting the requested LBAs of the received command. As described herein, a first "large" command list might include exclusive commands, and a second "large" command list might include non-exclusive commands. A conflict might exist if an exclusive command overlaps with the affected LBAs of the received command, or if any operation overlaps with the LBAs of the received command when the received command requires an exclusive lock. A conflict might also exist if there is not an available entry to track the received command, for example if there is not an available tracking entry in appropriate one of the exclusive and non-exclusive "large" command lists (i.e. the number of allowed exclusive or non-exclusive commands has reached a maximum).

At step 1112, if a received command encounters a conflict in at least one of steps 1108 and 1110, processing proceeds to step 1114, where the received command is queued until the conflict(s) are resolved. Step 1114 is described in greater detail with regard to FIG. 12. After the received command is queued at step 1114, at step 1116 processing returns to step 1010 to process active commands in media controller 104, which does not include the received command because it is queued due to a conflict. The processing for the queued received command is ceased until one or more conflicting commands are completed. If, at step 1112, no conflict was detected in steps 1108 and 1110, then the received command can be actively processed.

At step 1118, if the received command is a "small" command, processing continues to step 1120. If tracking segment(s) do not already exist for the LBAs affected by the received command, at step 1120 one or two tracking segments, as needed, are allocated for the LBAs. At step 1122, if the received command requires an exclusive lock on the affected LBAs, processing continues to step 1124 where the bit fields in the tracking segments are set to indicate that an exclusive command is active for the corresponding LBAs. If, at step 1122, the received command does not require an exclusive lock, processing continues to step 1126 where the non-exclusive lock counter is incremented for the LBAs affected by the received command. After the appropriate tracking data is updated at one of steps 1124 and 1126 corresponding to the received command, processing continues to step 1138, where the process returns to step 1010 to process the active commands, which now includes the received command.

At step 1118, if the received command is a "large" command, processing continues to step 1128. At step 1128, if the received command requires an exclusive lock, then at step 1134 an entry is allocated in the exclusive "large" command list to correspond to the received command. At step 1136, the allocated entry is updated to include the starting LBA and length of the received command. If, at step 1128, the received command does not require an exclusive lock, then at step 1130 an entry is allocated in the non-exclusive "large" command list to correspond to the received command. At step 1132, the allocated entry is updated to include the starting LBA and length of the received command. After the allocated entry is updated in either step 1132 or step 1136, processing continues to step 1138, where the process returns to step 1010 to process the active commands, which now includes the received command.

FIG. 12 shows an exemplary embodiment of the queuing operation of step 1114 of FIG. 11. As shown in FIG. 11, queuing operation 1114 might be started if either i) the GCQ is not empty and no tracking objects are available (step 1106) or ii) a conflict is detected for the received command (step 1112). As shown in FIG. 12, at step 1202, queuing operation 1114 is started. At step 1204, if there are tracking objects available to be allocated to the received command (e.g., the "small" command tracking segments of FIG. 14, or the "large" command lists of FIG. 15), and the general command queue (GCQ) is empty, then processing continues to step 1208. For example, if there are commands queued in the GCQ, the incoming command is added to the tail end of the GCQ at step 1206. If there are no commands on the GCQ, then processing of the received command continues at step 1208. At step 1208, if the received command is a "large" command, then processing continues to step 1214. At step 1214, the received "large" command is added to the tail end of the GCQ. Once the command is added to the GCQ, at step 1216 processing returns to step 1116. If, at step 1208, the received command is a "small" command, processing continues to step 1210.

At step 1210, a test determines whether the received "small" command is blocked in only one tracking segment or in the maximum of two tracking segments. If the received command is only blocked in one tracking segment, at step 1212, the received command is added to the segment command queue (SCQ) for that segment. In a first instance, if the received command only affects LBAs in one tracking segment, then at step 1212, the entire command is queued, for example in the SCQ for that segment. In a second instance, if the received command affects LBAs across more than one tracking segment, the received command is only queued for the LBAs in the blocked tracking segment. After the blocked segment is queued, at step 1216, processing returns to step 1116. If, at step 1210, the received command is blocked across both tracking segments, the received "small" command is added to the tail end of the GCQ at step 1214.

If, at step 1204, there are no tracking objects available to be allocated to the received command, or the GCQ was not empty, then at step 1206 the received command is added to the tail end of the general command queue (GCQ). At step 1216, the process returns to step 1116 of FIG. 11. As described in greater detail with regard to FIG. 13, commands are processed from the GCQ in the order they are received. When a command is completed, the next command in the GCQ is retrieved and checked for conflicts, until all commands on the GCQ have been completed.

FIG. 13 shows an exemplary embodiment of command completion operation 1012 of FIG. 10. Any time an active command is completed, command completion operation 1012 is performed to update and/or deallocate any corresponding command tracking entries, as well as to perform conflict checks before starting any queued commands. At step 1302, command completion operation 1012 is started. At step 1304, if the completed command was a "large" command, processing continues to step 1306. If the completed command was a "small" command, processing continues to step 1322.

At step 1306, the entry for a completed "large" command is removed from the corresponding "large" command tracking list. At step 1308, if the GCQ is empty, processing continues to step 1320, where the process returns to step 1014 of FIG. 10. If the GCQ is not empty, at step 1310, the head entry of the GCQ is retrieved, but the ordering of the GCQ is not changed. At step 1312, command conflict checking operation 1008 (shown in FIG. 11) is performed for the retrieved command, and the ordering of the GCQ is maintained. At step 1314, if the retrieved command did not have a conflict, the entry for the command is removed from the head of the GCQ at step 1316, and at step 1318 the command is actively processed at step 1010. Once the command is added to the actively processing commands, the process returns to step 1308. At step 1314, if the retrieved command does have a conflict, at step 1330 the retrieved command is placed (or retains its place) at the head end of the GCQ. Thus, as shown in FIG. 13, once a command is completed, steps 1308-1318 perform a loop that processes commands queued on the GCQ until either i) a conflict is encountered at step 1314, or ii) the GCQ is empty at step 1308.

At step 1304, if the completed command was a "small" command, processing continues to step 1322. At step 1322, the tracking segment(s) of the completed command are checked. At step 1324, if the segment command queue (SCQ) corresponding to the tracking segment is empty, processing continues to step 1326. If the SCQ is not empty, processing continues to step 1334. For "small" commands the affected LBAs across two tracking segments, step 1324 might be performed twice for one completed command, once for each tracking segment.

If, at step 1324, the SCQ for the corresponding segment is not empty, at step 1334 the head entry of the SCQ is retrieved. At step 1336, command conflict checking operation 1008 (shown in FIG. 11) is performed. If, at step 1338, no conflict is detected, at step 1341, the entry for the command is removed from the head of the SCQ. At step 1342 the retrieved "small" command is actively processed at step 1010, and the process returns to step 1324 to check the next entry of the SCQ. If, at step 1338, a conflict is detected, at step 1340 the command is returned to the head end of the SCQ, and the process continues to step 1308 to determine if a command queued on the GCQ can be processed. Similarly as steps 1308-1318 perform a loop for processing any commands queued on the GCQ, steps 1324, 1334, 1336 and 1338 perform a loop that processes "small" commands queued on an SCQ until either i) a conflict is encountered at step 1338, or ii) the SCQ for the corresponding segment(s) are empty at step 1324.

If, at step 1324 the SCQ for the corresponding segment is empty, at step 1326, buffer layer 210 checks whether there are any other active commands being tracked in the segment. If there are no other active commands for the segment, at step 1328 the tracking segment is deallocated and is available for use in processing other commands. If there are other active commands, step 1328 is bypassed since the tracking segment is still in use and cannot yet be deallocated. Processing then continues to step 1308 to determine if a command queued on the GCQ can be processed.

As described herein, embodiments of the present invention provide command tracking and conflict checking where i) commands are tracked differently based on the command size, ii) "small" commands might be queued in one segment while actively processing in other segments, iii) "small" commands are tracked using bit fields and counters that are arranged in a hash table sorted by starting LBA of each tracking segment, iv) "large" commands are tracked using linked lists having entries including the starting LBA and length of each "large" command, v) exclusive and non-exclusive commands are tracked separately, and vi) the command conflict tracking overhead is bypassed when command reordering is not restricted.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of tracking and processing commands received by a storage device, the method comprising:
   determining one or more requested logical block addresses (LBAs) of a received command, including a starting LBA and a length of one or more LBAs of the received command;
   determining whether command reordering is restricted; and
   if command reordering is not restricted:
      processing the received commands;
   otherwise, if command reordering is restricted:
      conflict checking each received command by:
         checking one or more small command tracking structures for one or more active small commands in conflict with the received command; and
         checking one or more large command tracking structures for one or more active large commands in conflict with the received command;
      if no conflict is detected:
         tracking and processing the received command by:
            determining whether the received command is (i) an exclusive command requesting exclusive access to the requested LBAs or ii a non-exclusive command requesting non-exclusive access to the requested LBAs;
            for each exclusive command having a length less than or equal to a predetermined size:
               allocating, if appropriate, at least one tracking entry in the one or more small command tracking structures; and
               updating fields of the at least one allocated tracking entry,
               wherein the updated fields correspond to the requested LBAs;
            otherwise, for each exclusive command with length greater than the predetermined size:
               allocating a tracking entry in an exclusive large command tracking structure; and
               updating the tracking entry with the starting LBA and length of the received command;
         otherwise, if a conflict is detected:
            queuing the received command in a general command queue of the storage device.

2. The invention of claim 1, wherein, when processing of a command completes, the method further comprises:
   iteratively retrieving a queued command from a head end of the general command queue until detection of a conflict;
   conflict checking the retrieved command; and
   if no conflict is detected, for each retrieved command:
      removing the retrieved command from the general command queue;
      tracking and processing the retrieved command;
      retrieving a next command from the head end of the general command queue; and
   otherwise, if a conflict is detected:
      returning the retrieved command to the head end of the general command queue.

3. The invention of claim 1, wherein the step of determining whether command reordering is restricted comprises:
   checking the SCSI Queue Algorithm Modifier (QAM) field for a QAM setting, wherein the QAM setting of a first logic value indicates that command reordering is restricted, and the QAM setting of a second logic value indicates that command reordering is not restricted.

4. The invention of claim 1, wherein the step of tracking the received command further comprises:
   for each non-exclusive command with length less than or equal to a predetermined size:
      allocating, if appropriate, at least one non-exclusive command counter corresponding to the requested LBAs; and
      incrementing the at least one allocated non-exclusive command counter corresponding to the requested LBAs;
   for each non-exclusive command with length greater than the predetermined size:

allocating a tracking entry in a non-exclusive large command tracking structure; and
updating the tracking entry with the starting LBA and length of the received command.

5. The invention of claim 4, wherein:
for the step of allocating the tracking entry:
the small command tracking structure comprises:
a hash table having one or more entries, sorted by the starting LBA of each entry,
each entry comprising a plurality of bit fields corresponding to each block in a predetermined range of LBAs,
for the step of tracking the command:
setting one or more of the plurality of bit fields to a predefined value if the corresponding block is accessed by an exclusive small command; and
incrementing a corresponding non-exclusive command counter at access of one or more corresponding blocks.

6. The invention of claim 5, wherein the predetermined range of LBAs is equal to the predetermined command size.

7. The invention of claim 4, wherein the predetermined size is 128 blocks.

8. The command of claim 4, wherein a small command is tracked by at most two tracking entries.

9. The invention of claim 4, wherein:
the exclusive large command tracking structure and the non-exclusive large command tracking structure comprise a doubly-linked list having one or more entries,
wherein, for the step of tracking the command, each entry includes the starting LBA and length of active exclusive and non-exclusive large commands, respectively.

10. The invention of claim 1, wherein the step of queuing the received command further comprises:
if command tracking structures are available to be allocated for the received command:
for a large received command:
adding the received command to a tail end of the general command queue;
for a small received command:
determining the number of command tracking entries in which the received command has a conflict;
if the received command is blocked in only one tracking entry, adding the command to a segment command queue corresponding to the blocked tracking entry;
if the received command is blocked in more than one tracking entry, adding the command to the tail end of the general command queue; and
otherwise, if command tracking structures are unavailable to be allocated for the received command:
adding the received command to the tail end of the general command queue.

11. The invention of claim 10, when processing of a small command completes, the method further comprises:
iteratively retrieving a queued small command from a head end of the segment command queue of the tracking entry until detection of a conflict;
conflict checking the retrieved command; and
if no conflict is detected, for each retrieved command:
removing the retrieved command from the segment command queue;
tracking and processing the retrieved command;
retrieving a next command from the head end of the segment command queue; and
otherwise, if a conflict is detected:
returning the retrieved command to the head end of the segment command queue.

12. The invention of claim 1, wherein a total number of command tracking structures corresponds to a maximum queue depth of the storage device.

13. The invention of claim 1, wherein, for the method, the storage device comprises a flash memory, the flash memory with at least one flash memory die.

14. The invention of claim 1, wherein the received command is one of: read, write, skip-read, and skip-write.

15. A non-transitory machine-readable storage medium, having encoded thereon program code, wherein, when the program code is executed by a machine, the machine implements a method of tracking and processing commands received by a storage device, the method comprising:
determining one or more requested logical block addresses (LBAs) of a received command, including a starting LBA and a length of one or more LBAs of the received command;
determining whether command reordering is restricted; and
if command reordering is not restricted:
processing the received commands;
otherwise, if command reordering is restricted:
conflict checking each received command by:
checking one or more small command tracking structures for one or more active small commands in conflict with the received command; and
checking one or more large command tracking structures for one or more active large commands in conflict with the received command;
if no conflict is detected:
tracking and processing the received command by:
determining whether the received command is (i) an exclusive command requesting exclusive access to the requested LBAs or (ii) a non-exclusive command requesting non-exclusive access to the requested LBAs;
for each exclusive command having a length less than or equal to a predetermined size:
allocating, if appropriate, at least one tracking entry in the one or more small command tracking structures; and
updating fields of the at least one allocated tracking entry,
wherein the updated fields correspond to the requested LBAs;
otherwise, for each exclusive command with length greater than the predetermined size:
allocating a tracking entry in an exclusive large command tracking structure; and
updating the tracking entry with the starting LBA and length of the received command;
otherwise, if a conflict is detected:
queuing the received command in a general command queue of the storage device.

16. An apparatus for tracking and processing commands received by a storage device, the apparatus comprising:
a host layer module adapted to i) determine one or more requested logical block addresses (LBAs) of a received command, including a starting LBA and a length of one or more LBAs of the received command, and ii) determine whether command reordering is restricted;
a buffer layer module adapted to i) conflict check for each received command, ii) process received commands that do not have detected conflicts, iii) track commands that are being processed, and iv) queue the received commands that do have detected conflicts;

a general command queue adapted as a first-in, first-out command queue for the storage device;

one or more small command tracking structures including bit fields corresponding to each one of a predetermined number of blocks, wherein a small command is a command that accesses less than or equal to the predetermined number of blocks;

at least one small command tracking structure adapted to track exclusive commands, and at least one corresponding non-exclusive small command counter adapted to track non-exclusive small commands;

one or more large command tracking structures including entries for the starting LBA and length of one or more commands, wherein one large command tracking structure is adapted to track exclusive commands, and another large command tracking structure is adapted to track non-exclusive commands;

a buffer for storing the one or more small command tracking structures and the one or more large command tracking structures; and one or more registers for updating and checking the one or more small command tracking structures.

17. The invention of claim 16, wherein entries in the one or more small command tracking structures include corresponding segment command queues adapted to queue small commands having a detected conflict.

18. The invention of claim 16, wherein the storage device comprises at least one flash memory.

19. The invention of claim 16, wherein the apparatus is implemented in a monolithic integrated circuit chip.

* * * * *